US009985404B2

(12) United States Patent
Fries et al.

(10) Patent No.: US 9,985,404 B2
(45) Date of Patent: May 29, 2018

(54) METHOD FOR PRODUCING A CABLE END CRIMP CONNECTION

(71) Applicant: Komax Holding AG, Dierikon (CH)

(72) Inventors: Andreas Fries, Lucerne (CH); Kurt Ulrich, Stans (CH); Stefan Viviroli, Horw (CH)

(73) Assignee: KOAX HOLDING AG, Dierikon (CH)

( * ) Notice: Subject to any disclaimer, the term of this patent is extended or adjusted under 35 U.S.C. 154(b) by 227 days.

(21) Appl. No.: 14/695,098

(22) Filed: Apr. 24, 2015

(65) Prior Publication Data

US 2015/0311659 A1 Oct. 29, 2015

(30) Foreign Application Priority Data

Apr. 25, 2014 (EP) .................................... 14166003

(51) Int. Cl.
*B23B 23/00* (2006.01)
*H01R 43/048* (2006.01)
*H01R 43/052* (2006.01)
*H01R 43/05* (2006.01)

(52) U.S. Cl.
CPC ......... *H01R 43/0486* (2013.01); *H01R 43/05* (2013.01); *H01R 43/052* (2013.01)

(58) Field of Classification Search
CPC . H01R 43/052; H01R 43/28; Y10T 29/53235; Y10T 29/514; Y10T 29/49192; C07K 14/70578; G01N 2333/525; G01N 33/6863
See application file for complete search history.

(56) References Cited

U.S. PATENT DOCUMENTS

| | | | | | |
|---|---|---|---|---|---|
| 3,927,590 | A * | 12/1975 | Gudmestad | B21F 11/00 83/151 |
| 5,025,549 | A | 6/1991 | Hornung et al. | |
| 5,289,713 | A * | 3/1994 | Schafer | H01R 43/0488 100/257 |
| 6,035,521 | A * | 3/2000 | Schley | H01R 43/048 29/505 |
| 6,135,164 | A * | 10/2000 | Celoudoux | H01R 43/28 140/102 |
| 6,886,438 | B2 * | 5/2005 | Viviroli | H01R 43/28 81/9.51 |
| 7,152,310 | B2 * | 12/2006 | Conte | H01R 43/048 29/33 M |
| 7,562,441 | B2 * | 7/2009 | Conte | H01R 43/048 29/33 M |
| 9,416,488 | B2 * | 8/2016 | Stier | D07B 3/04 |
| 9,419,399 | B2 * | 8/2016 | Viviroli | H01R 43/052 |

FOREIGN PATENT DOCUMENTS

| | | |
|---|---|---|
| EP | 1424757 A1 | 6/2004 |
| EP | 1447888 A1 | 8/2004 |
| EP | 1786072 A1 | 5/2007 |

* cited by examiner

*Primary Examiner* — Minh Trinh
(74) *Attorney, Agent, or Firm* — William J. Clemens; Shumaker, Loop & Kendrick, LLP

(57) ABSTRACT

A method for producing a crimp connection includes initially guiding a cable end of a cable with a gripper to a crimping press. For this feed movement the gripper is moved by an actuator in an axial direction along the cable axis. The cable end is thereafter connected with a crimp contact. During the crimping process the gripper is, for compensation for length extension of the cable during crimping, moved along the cable axis in a return movement in an opposite direction to the feed movement.

9 Claims, 2 Drawing Sheets

METHOD FOR PRODUCING A CABLE END CRIMP CONNECTION

FIELD

The invention relates to a method of producing a crimp connection and a crimping device for producing such a crimp connection.

BACKGROUND

By "crimping" there is understood the production of a non-detachable electrical and mechanical connection (crimp connection) by plastic deformation between a conductor and a crimp contact. Crimping devices are frequently a component of cable preparation devices for preparation of electric cables, in which the cable is cut to length and stripped and in which a crimp contact is then mounted on the stripped conductor end of the cable by a crimping press. The known crimping devices include cable grippers by which the cable ends are fed to the crimping press. As soon as the cable gripper has reached the final axial position over the crimp contact it remains in unchanged axial position until the conclusion of the crimping process and is lowered with use of, in a given case, a lowering device connected with the press member of the crimping press. Crimping devices of that kind have become known from, for example, EP 1 447 888 A1. The known crimping devices have proved satisfactory in practice for conventional cables containing conductors or wires of copper. For reasons of cost and weight, for some time electrical cables with conductors of aluminum have enjoyed increasing popularity. Particularly in the case of the last-mentioned cables, problems can arise during crimping by conventional methods and devices. Thus, during crimping of cables with conductors or wires of aluminum it can happen that the wire material is strongly deformed in the direction of the cable axis in such a way that kinking of the cable between crimp location and cable gripper occurs. This undesired length extension of the cable can cause permanent deformation of the cable.

SUMMARY

It is accordingly an object of the invention to avoid the disadvantages of the prior art and, in particular, to create a method of producing a crimp connection and a crimping device by which the disadvantageous consequences of undesired length extension of the cable during crimping can, at least, be reduced.

The method of producing the crimp connection comprises, as a first step, feeding of the cable end to the crimping press. For the feeding process use is made of a gripper which grips the cable end and can move along the longitudinal direction of the cable or in the direction of the cable axis. The gripper can, depending on the respective form of construction, additionally execute a pivot movement about a vertical axis of rotation. At the end of the feed process the cable is disposed with the preferably previously already stripped cable end in the correct axial position. Thereafter, the cable end is connected with the crimp contact by, for example, moving a press member of the crimping press in vertical direction. Due to the fact that during the crimping process the gripper is—for compensation for the length extension of the cable as a consequence of the plastic deformation of the conductor during crimping—moved passively or actively along the cable axis of the cable in a return movement (i.e. in opposite direction to the previously mentioned feed movement) the undesired effects of length extension during crimping are avoided in simple mode and manner. Buckling out of the cable length between the connecting point and place of action by the gripper can be virtually excluded.

For feeding of the cable end to the crimping press the gripper can be moved in axial direction with use of an actuator. Mechanical, pneumatic or hydraulic systems can be employed as actuators. In order provide compensation for the length extension of the cable during crimping the actuator can be set so that it permits a return movement in correspondence with the length extension of the cable during crimping. The actuator can, for example, be instructed by way of an appropriate control signal to actively execute the return movement.

If an electric motor by which the gripper is axially movable and by which a predetermined holding moment can be applied to the gripper head is provided as the actuator it can be advantageous if for permitting the return movement the electric motor is so activated in a compensation mode associated with the return movement that the holding moment is reduced. Thanks to the reduced holding moment it is possible in simple manner to produce a passive movement of the gripper in opposite direction to the feed movement with use of the longitudinal forces which arise in the cable as a consequence of the deformations of conductor material during crimping.

If the crimping device has—for example in place of an electric motor—a pneumatic cylinder as the actuator it can be advantageous if the pressure in the cylinder is reduced, whereby a return movement of the gripper can be permitted to provide compensation for the length extension.

Contact between crimp contact and the movable press member of the crimping press can be ascertained, for example, with use of a contact sensor or by means of travel and/or time detection. Alternatively, the crimping force could, for example, be measured with use of a force sensor. The compensation mode is started as soon as the contact between crimp contact and press member is ascertained or as soon as a predetermined value for the crimping force is exceeded.

According to a further form of embodiment the gripper can be moved during the crimping process by activation of a drive or another actuator to actively perform the return movement. This active mode of operation is particularly advantageous when very thin or less stiff cables are used, since the friction forces and inertia forces to be overcome for movement of the gripper are too large and the cable could bulge out notwithstanding reduction in the previously described holding moment.

It can be advantageous if the gripper is moved through a predetermined compensation travel. The compensation travel can be ascertained by computation. However, it is also conceivable to determine the compensation travel by testing.

For preference, with respect to compensation for the length extension of the cable during crimping the gripper is moved with reduced drive power by comparison with the drive power which is, for example, decisive for the feed process, whereby gentle handling of the cable can be ensured.

It can then be particularly advantageous if the tension force on the cable during the return movement for compensation for the length extension of the cable is measured and monitored. In this way, undesired over-stretching of the cable during the compensation step can be prevented.

In terms of device, the invention is distinguished by the fact that the gripper is moved or is movable or mobile in axial direction at least in a section during the crimping process in which a press member, which is movable in vertical direction, is moved against the cable end. The gripper is a component of a feed unit for feeding the cable end to the crimping press. The gripper is movable in axial direction along the cable axis for the feed process. The crimping device further comprises a crimping press, wherein the crimping press comprises a drivable press member which is movable in vertical direction and by which the cable end of the cable can be connected with the crimp contact.

In a first form of embodiment the gripper can be so constructed that it is axially fixed at the start of the crimping process and is axially movable or axially mobile only after a first vertical movement of the press member. By "start of the crimping process" there is to be understood in the present case the time instant from which the movable press member of the crimping press executes a lowering movement from a starting position. The first vertical movement of the press member ends, for example, on contacting of the crimp contact by the press member of the crimping press.

The crimping device can comprise an activatable gripper which apart from a feed mode for feeding the cable end to the crimping press and optionally for stripping the cable end is operable in a compensation mode in which for compensation for the length extension of the cable during crimping the gripper is mobile or movable in axial direction. The gripper can accordingly also be used as pull-off gripper for stripping the cable end.

The feed unit can comprise an actuator for axial movement of the gripper. The crimping device can comprise control means for activating the actuator. In that case the control means are such that for compensation for the length extension of the cable during crimping the actuator permits a return movement in correspondence with the length extension of the cable.

The feed unit can comprise an electric motor, by which a predetermined holding moment can be applied to the gripper, as actuator for axial movement of the gripper.

The electric motor can further comprise a motor control by which the holding moment for permitting the return movement for compensation for the length extension can be temporarily reduced.

The feed unit can be constructed as a linear drive with a pinion and rack, wherein the pinion is preferably drivable by way of servomotor. The desired axial position of the gripper can be precisely activated by such a servomotor. The servomotor, which is connected with the pinion directly or by way of a transmission, can apply a precisely determinable holding moment to the pinion. By way of the motor control the holding moment can be reduced in simple manner, in which case the return movement for compensation for the length extension of the cable during crimping can be made possible in simple and efficient manner.

A further aspect of the invention can relate to a computer program product which, if it is loaded into the memory of a control for the crimping process, executes the function of the method as described above.

DESCRIPTION OF THE DRAWINGS

Further individual features and advantages of the invention are evident from the following description of an embodiment and from the drawings, in which.

DETAILED DESCRIPTION

Figure 1:
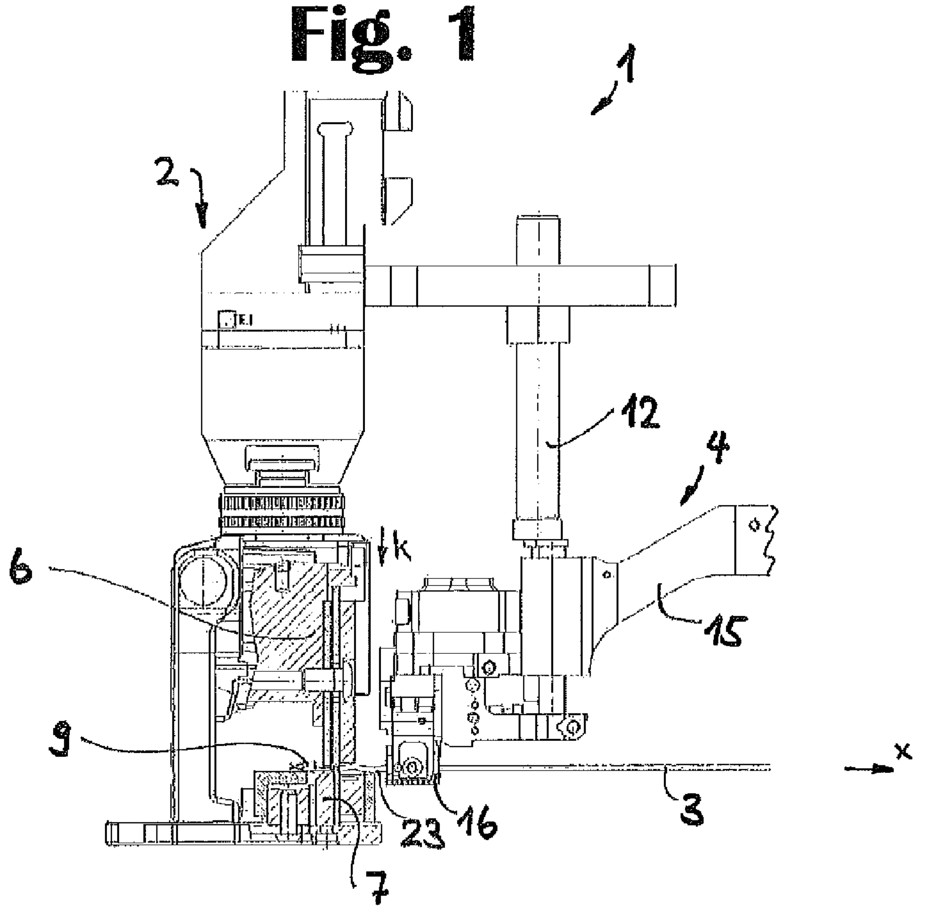
FIG. 1 shows a side view with partly sectional illustration of a crimping device.

FIG. 1 shows a crimping device, which is denoted overall by 1, for producing crimp connections. The crimping device 1 comprises a crimping press 2 having a press member 6, which is drivable by way of an electric motor and movable in vertical direction and by which a cable end 11 (FIG. 3) of a cable 3 is connectible with a crimp contact 9. The longitudinal axis of the cable 3 is denoted by x. The press member 6 comprises a carriage, on the underside of which a tool holder is arranged. The tool holder carries a crimping tool at which a crimping die for pressing the crimping contact together with the cable end is arranged. This crimping die co-operates in a mode and manner known per se with an anvil 7 which forms the counter-member relative to the crimping die. With respect to constructional details, reference is made by way of example to the crimping devices shown in EP 1 351 349 A1 or EP 1 447 888 A1. The cable 3 is held by a gripper 4. The gripper 4 has a gripper head with gripper jaws 16, which are movable relative to one another, for gripping the cable 3. The gripper jaws can, for example, be pneumatically actuable. The gripper head with the gripper jaws 16 is mounted to be vertically movable relative to a gripper arm 15 of the gripper 4. In the illustration according to FIG. 1 the press member 6 is disposed in a lowermost position in which the crimp contact 9 has been completely pressed together with the conductor of the cable end of the cable 3. The closing movement of the press member 6 necessary for that purpose is indicated by an arrow k. The gripper head with the gripper jaws 16 can be vertically moved by way of a lowering device 12 rigidly connected with the carriage of the press member 6.

Since the gripper 4 during the crimping process in accordance with the known method is stationary with respect to the cable axis x it can happen that the piece of cable clamped in place between the gripper jaws 16 and crimping tool bulges out as a consequence of the length extension of the cable due to the deformation of the conductor material. This cable bulging of the piece of cable is schematically illustrated in FIG. 1 and denoted by 23. In the case of excessive bulging out it is possible for buckling of the cable to occur, whereby the finished cable counts as faulty and can no longer be used for the intended purpose of use. In order to avoid this, the solution described in the following has been developed.

Figure 2:
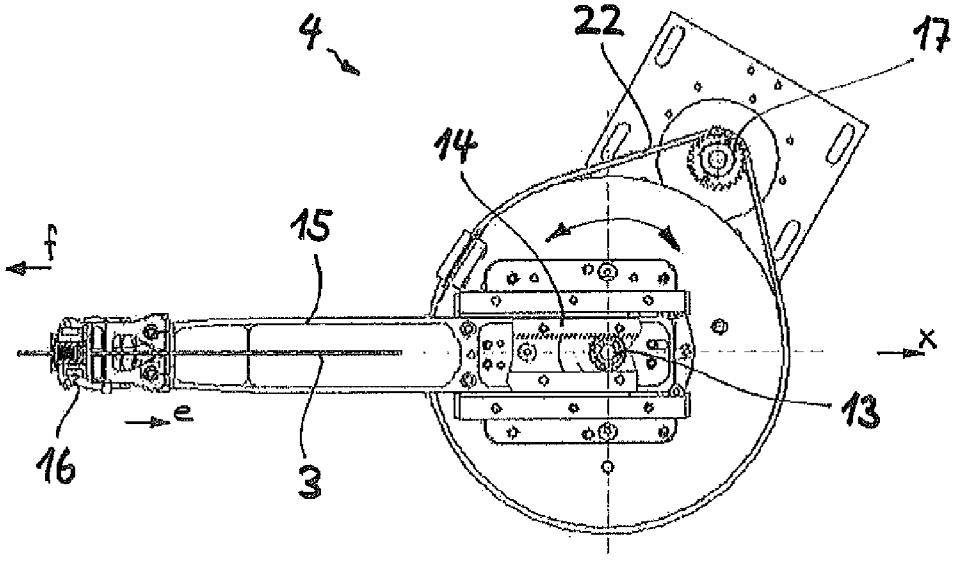
FIG. 2 shows a plan view of a feed unit with a gripper for the crimping device according to FIG. 1.

FIG. 2 shows a feed unit with a gripper 4 for feeding the cable end to a crimping press (not illustrated here). The gripper 4 has a gripper arm 15, at the front end of which the gripper head with the gripper jaws 16 is arranged. The feed movement is indicated by an arrow f. The gripper 4 has an actuator by which the gripper head is reciprocatingly movable in the x direction. This adjusting mechanism for the axial movement of the gripper comprises a drivable pinion 13, which co-operates with a rack 14 attached to the gripper arm 15. In addition, it can be seen in FIG. 2 that the entire gripper 4 is pivotable about a vertical axis. The axial direction x is—as apparent in, for example, FIG. 2—determined by the cable end. When the cable end is pivoted out, the rear part of the cable can have a different orientation. The x axis also corresponds with the machine axis of the crimping press (cf. FIG. 1). For the pivot movement, the feed device has a drivable pinion 17 and a cogged belt 22. The two motors for the pivot movement and for the axial feed movement (motor 5 shown in FIG. 3) have angle encoders for positional feedback. The opposite direction to the feed movement is indicated by an arrow e. Drawing-off of the insulation during the stripping can also be realized by the gripper 4. The gripper 4 can consequently also be a component of a pull-off axis for an upstream pulling-off process for creating a stripped cable end.

In order to produce the crimp connection initially the cable end 11 of the cable 3 has to be fed by means of the gripper 4 to the crimping press 2. The feed movement in the axial direction x is indicated by the arrow f. The thus-fed cable 3 is now ready for the crimping process. The cable with the previously stripped cable end is disposed in the correct axial position. During the crimping process, in which the press member (not illustrated here) of the crimping press is moved in vertical direction against the cable end and the crimp contact, the gripper for compensation for the length extension of the cable as a consequence of plastic deformation of the conductor during crimping is moved passively or actively along the cable axis of the cable in the opposite direction e to the feed movement. This return movement indicated by the arrow e ensures that undesired buckling out of the piece of cable between the connecting point and place of action by the gripper can be excluded. The undesired effects of the length extension during crimping can thus be avoided.

Figure 3:
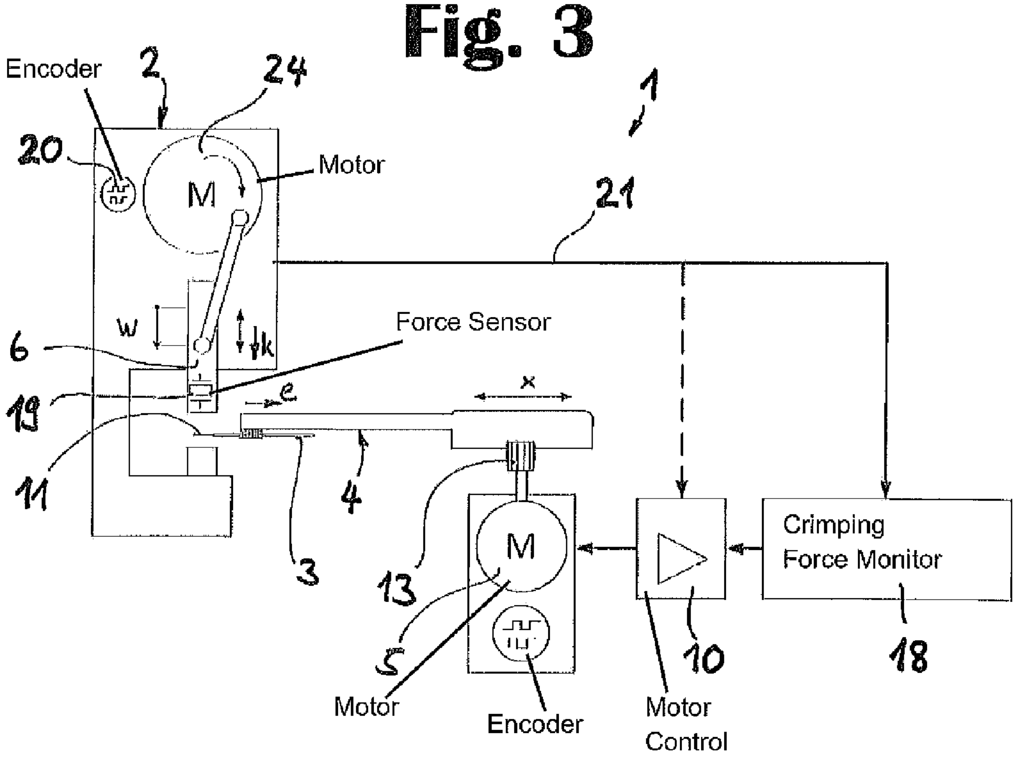
FIG. 3 shows a schematic illustration of a crimping device according to the invention.

FIG. 3 shows the crimping device 1 in a highly schematic illustration. The crimping press 2 comprises a vertically movable press member 6, which is drivable by way of the motor 24. The crimping press is equipped with crimping force monitoring means 18 which can detect the crimping force over the travel. The press member 6 is equipped with a force sensor 19 by which the crimping force can be measured. Moreover, it is possible by way of the encoder 20 to detect the travel w for the lowering movement of the press member 6. Signals generated by the sensor 19 and the encoder 20 are sent to the crimping force monitor 18 over a line 21. Additionally or alternatively the crimping press could also comprise a linear measuring system at the press carriage. The gripper 4 can be so activated with the help of the motor control 10 that the gripper 4 for compensation for the length extension of the cable during crimping is axially movable or mobile (compensation mode) in a return movement (arrow e).

Figure 4:
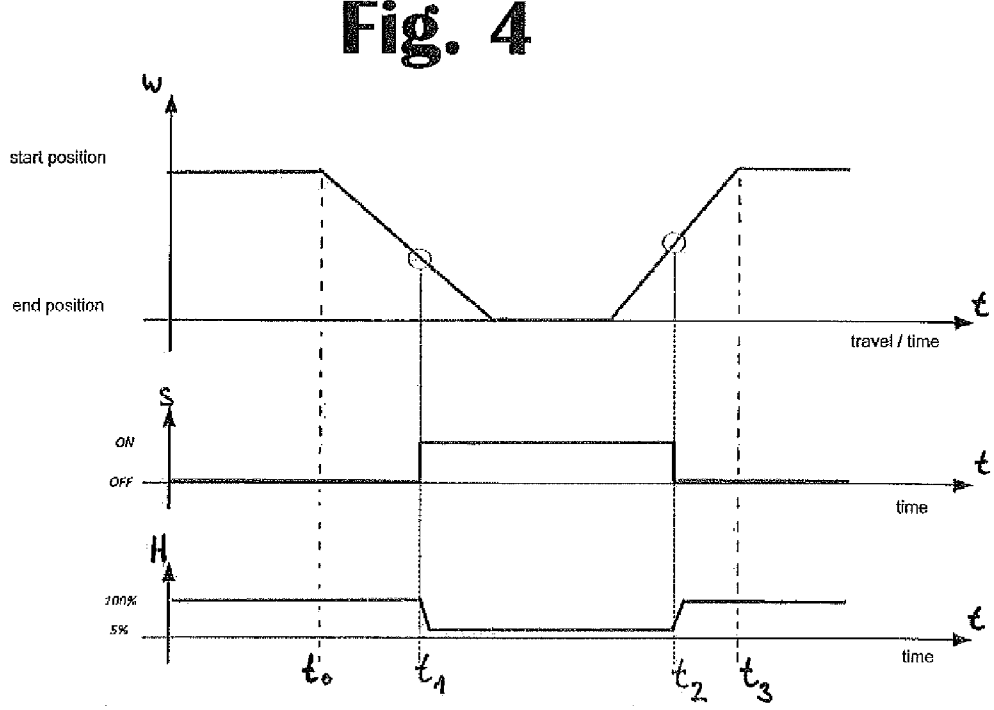
FIG. 4 shows the sequence of a crimping process with graphical illustrations for the press position of the crimping press as well as control signal and holding movement of the servomotor driving the gripper.

FIG. 4 relates to a configuration in which the gripper for compensation for the length extension of the cable during crimping is passively moved in a return movement. The first or upper plot shows the vertical position of the press member of the crimping press (press position w) as a function of time t. The middle plot relates to the activation of the gripper during the crimping process. The control signal for the gripper is denoted by S. Finally, the lower plot shows the holding moment H of the servomotor for the axial movement of the gripper in dependence on time t. At the start to of the crimping process the gripper is axially fixed. Only after a first vertical movement of the press member can the gripper axially move. This time instant is denoted by $t_1$. The time instant $t_1$ can be approximately the instant in time of loading of the crimp contact and/or the conductor of the cable by the press member. At the time instant $t_1$ the servomotor connected with the pinion is instructed by way of a control signal S to reduce the holding moment H from 100% to, for example, 5%. Depending on the respective type of motor and cable to be crimped it could, however, also be sufficient to reduce the holding moment from 100% to 30%. The reduced holding moment now makes possible the desired return movement for compensation for the length extension of the cable during crimping. The control signal is maintained until the time instant $t_2$ (control at "ON") and thereafter the original holding moment is again set (holding moment H=100%). As evident from FIG. 4, the time instant $t_2$ is located approximately at half the upward movement of the press member 6. The time instant at which the press member is again disposed in its original starting position is denoted by $t_3$.

Alternatively, an embodiment is also conceivable in which the gripper is actively moved during the crimping process by activation of a drive or actuator. The gripper is in that case advantageously moved through a predetermined compensation travel. Moreover, the gripper in the compensation mode advantageously has to be operated in such a way that the drive power is reduced by comparison with the drive power for the feed process. Finally, for a reliable procedure the tension force on the cable during the return movement for compensation for the length extension of the cable during crimping should be measured and monitored.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for producing a crimp connection comprising the steps of:

providing a crimping device including a crimping press and a gripper, a cable having a stripped conductor cable end and a crimp contact;

feeding the cable end of the cable to the crimping press with the gripper; and connecting the cable end with the crimp contact by simultaneously crimping with the crimping press while moving the gripper along an axis of the cable in a return movement opposite in direction to the movement during the feeding to provide compensation for length extension of the cable during the crimping.

2. The method according to claim 1, wherein:

the gripper includes an actuator configured to move the gripper in an axial direction along the axis of the cable;

feeding the cable end of the cable to the crimping press with the gripper includes using the actuator to move the gripper in the axial direction along the axis of the cable; and moving the gripper along an axis of the cable in a return movement opposite in direction to the movement during the feeding includes using the actuator to move the gripper in the return movement opposite in direction to the movement during the feeding.

3. The method according to claim 2, wherein:

the actuator is an electric motor configured to apply a predetermined holding moment to the gripper; and using the actuator to move the gripper in the return movement opposite in direction to the movement during the feeding includes activating the electric motor to reduce the predetermined holding moment.

4. The method according to claim 3, wherein:

connecting the cable end with the crimp contact includes contacting the crimp contact with a movable press member of the crimping press, the contacting determined by at least one of a travel of the movable press member and a time from which the movable press member executes a lowering movement from a starting position; and using the actuator to move the gripper in the return movement is started or permitted upon contact between the crimp contact and the movable press member.

5. The method according to claim 2, wherein:

moving the gripper along an axis of the cable in a return movement opposite in direction to the movement during the feeding includes using the actuator to move the gripper in the return movement opposite in direction to the movement during the feeding using a predetermined compensation value for the return movement.

6. The method according to claim 2, wherein:

using the actuator to move the gripper in the return movement opposite in direction to the movement during the feeding includes using a drive power that is reduced compared to a drive power used during the feeding.

7. The method according to claim 2, wherein:

moving the gripper along an axis of the cable in a return movement opposite in direction to the movement during the feeding includes measuring and monitoring a tension force on the cable.

8. A method for producing a crimp connection using a crimping press, a gripper for feeding a stripped conductor cable end of a cable to the crimping press, and an actuator for axial movement of the gripper along an axis of the cable, comprising the steps of:

providing the cable with the stripped conductor cable end and a crimp contact;

feeding the cable end of the cable to the crimping press with the gripper moved by the actuator; and connecting the cable end with the crimp contact by simultaneously crimping with the crimping press while moving the gripper by the actuator along the axis of the cable in a return movement opposite in direction to the movement during the feeding to provide compensation for length extension of the cable during the crimping.

9. The method according to claim 3, wherein:

crimping with the crimping press includes measuring a crimping force; and moving the gripper along an axis of the cable in a return movement is started or permitted upon exceeding a predetermined value for the crimping force.

* * * * *